(12) United States Patent
Sedlacek et al.

(10) Patent No.: US 11,109,219 B2
(45) Date of Patent: Aug. 31, 2021

(54) MOBILE TERMINAL, NETWORK NODE SERVER, METHOD AND COMPUTER PROGRAM

(71) Applicant: Telefonaktiebolaget LM Ericsson (publ), Stockholm (SE)

(72) Inventors: Ivo Sedlacek, Hovorcovice (CZ); Zu Qiang, Kirkland (CA); Peter Hedman, Helsingborg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/563,891

(22) Filed: Sep. 8, 2019

(65) Prior Publication Data

US 2020/0036715 A1   Jan. 30, 2020

Related U.S. Application Data

(62) Division of application No. 14/398,691, filed as application No. PCT/EP2013/056613 on Mar. 27, 2013, now Pat. No. 10,447,695.

(Continued)

(30) Foreign Application Priority Data

May 8, 2012 (EP) .................................... 12167078

(51) Int. Cl.
  *H04W 84/12*  (2009.01)
  *H04W 8/18*   (2009.01)
  (Continued)

(52) U.S. Cl.
  CPC ........... *H04W 8/18* (2013.01); *H04L 63/0892* (2013.01); *H04W 12/069* (2021.01);
  (Continued)

(58) Field of Classification Search
  CPC .......... G06F 2221/2129; H04W 84/12; H04W 88/06; H04W 84/042; H04W 48/08; H04W 12/069; H04W 8/18; H04L 63/0892
  (Continued)

(56) References Cited

U.S. PATENT DOCUMENTS

2003/0119481 A1   6/2003  Haverinen et al.
2004/0066756 A1*  4/2004  Ahmavaara ........... H04W 48/18
                                                           370/328

(Continued)

FOREIGN PATENT DOCUMENTS

EP    1513358 A1   3/2005
WO    2005002140 A1   1/2005

OTHER PUBLICATIONS

Brazilian Office Action dated Jun. 16, 2020 in connection with Brazil Application No. BR112014027527, 5 pages.

(Continued)

*Primary Examiner* — Josnel Jeudy
(74) *Attorney, Agent, or Firm* — Leffler Intellectual Property Law, PLLC

(57) ABSTRACT

Methods of operating a network node in a wireless local area network, a mobile terminal and a server, respectively, are disclosed. Corresponding computer programs, as well as a network node, a mobile terminal and a server are also disclosed. The network node establishes connection with the mobile terminal; and sends at least one network name to the mobile terminal, wherein the at least one network names correspond to possible public land mobile networks, PLMNs, based on the determined AAA information. The mobile terminal can thus display the network name.

4 Claims, 11 Drawing Sheets

Related U.S. Application Data

(60) Provisional application No. 61/648,755, filed on May 18, 2012.

(51) Int. Cl.
  *H04W 12/069* (2021.01)
  *H04L 29/06* (2006.01)
  *H04W 48/08* (2009.01)
  *H04W 84/04* (2009.01)
  *H04W 88/06* (2009.01)

(52) U.S. Cl.
  CPC .......... *H04W 48/08* (2013.01); *H04W 84/042* (2013.01); *H04W 84/12* (2013.01); *H04W 88/06* (2013.01)

(58) Field of Classification Search
  USPC .............................................................. 726/7
  See application file for complete search history.

(56) References Cited

U.S. PATENT DOCUMENTS

| | | | |
|---|---|---|---|
| 2005/0153684 A1* | 7/2005 | Rodrigo | H04M 7/00 455/411 |
| 2005/0272465 A1 | 12/2005 | Ahmavaara et al. | |
| 2006/0002351 A1* | 1/2006 | Madour | H04L 61/2084 370/338 |
| 2006/0077925 A1 | 4/2006 | Rune | |
| 2006/0078119 A1 | 4/2006 | Jee et al. | |
| 2006/0095954 A1* | 5/2006 | Buckley | H04W 48/18 726/2 |
| 2006/0153135 A1* | 7/2006 | Ascolese | H04W 48/18 370/331 |
| 2007/0070958 A1* | 3/2007 | Rinne | H04L 47/825 370/338 |
| 2010/0056106 A1* | 3/2010 | Korhonen | H04L 9/321 455/411 |
| 2010/0322216 A1* | 12/2010 | Roger | H04W 12/0609 370/338 |
| 2011/0032902 A1 | 2/2011 | Kim | |

OTHER PUBLICATIONS

English language translation of Brazilian Office Action dated Jun. 16, 2020 in connection with Brazil Application No. BR112014027527, 2 pages.

Extended European Search Report, dated Sep. 28, 2012, in connection with European Patent Application No. 12167078, all pages.

PCT International Search Report, dated Aug. 5, 2013, in connection with International Application No. PCT/EP2013/056613, all pages.

PCT Written Opinion, dated Aug. 5, 2013, in connection with International Application No. PCT/EP2013/056613, all pages.

International Preliminary Report on Patentability, dated Nov. 20, 2014, in connection with International Application No. PCT/EP2013/056613, all pages.

3GPP TS 24.008, V3.0.0 "Mobile radio interface layer 3 specification, Core Network Protocols—Stage 3 (TS24.008 version 3.0.0)" Jul. 1999, pp. 1-368.

3GPP TS 23.003, V8.4.0 "Numbering, addressing and identification (Release 8)" Mar. 2009, Section 19.3.3, pp. 1-71.

3GPP TS 23.402, V8.1.1 "Architecture enhancements for non-3GPP accesses (Release 8)" Mar. 2008, Sections 4.9.1 and 4.9.2, pp. 1-163.

3GPP TS 33.402, V8.4.0 "3GPP System Architecture Evolution (SAE); Security aspects of non-3GPP accesses; (Release 8)", Jun. 2009, Sections 6.2 and 8.2.2, Figures 6.2-1 and 8.2.1-1, pp. 1-44.

3GPP TS 33.234, V6.3.0 "3G Security; Wireless Local Area Network (WLAN) interworking security (Release 6)" Dec. 2004, Section 6.1.1.1 and Figure 4, pp. 1-84.

3GPP TS 23.234, V6.3.0 "3GPP System to Wireless Local Area Network (WLAN) interworking; System description (Release 6)" Dec. 2004, Section 7.2, pp. 1-99.

3GPP TS 24.234, V6.1.1 "3GPP System to Wireless Local Area Network (WLAN) interworking; User Equipment (UE) to network protocols; Stage 3 (Release 6)" Jan. 2005, Section 4.4.1, pp. 1-25.

3GPP TS 24.302, V11.2.0 "3rd Generation Partnership Project; Technical Specification Group Core Network and Terminals; Access to the 3GPP Evolved Packet Core (EPC) via non-3GPP access networks; Stage 3 (Release 11)" Mar. 2012, pp. 1-59.

Wi-Fi Alliance Technical Committee, Hotspot 2.0 Task Group, "Hotspot 2.0 Specification, Phase 1, Version 0.41", Wi-Fi Alliance, Austin, TX, Mar. 21, 2012, pp. 1-28.

English translation of Korean Office Action, dated Jul. 18, 2019, in connection with Korean Application No. 10-2014-7034036, 7 pages.

* cited by examiner

MOBILE TERMINAL, NETWORK NODE SERVER, METHOD AND COMPUTER PROGRAM

CROSS-REFERENCE TO RELATED APPLICATIONS

This application claims the benefit of U.S. application Ser. No. 14/398,691, filed Nov. 3, 2014; which is a § 371 national stage of PCT/EP2013/056613 filed Mar. 27, 2013; which claims priority under 35 U.S.C. § 119 to European Patent Application No. 12167078.0, filed May 8, 2012; and which also claims the benefit of U.S. Provisional Application No. 61/648,755, filed May 18, 2012. All of these earlier applications are hereby incorporated herein by reference in their entireties.

TECHNICAL FIELD

The present invention generally relates to a mobile terminal, a network node and a server, methods for operating each of them, and computer programs for implementing the methods.

BACKGROUND

Abbreviations

3GPP 3rd Generation Partnership Project
UMTS Universal Mobile Telecommunication System
UTRAN UMTS Terrestrial Radio Access Network
GSM Global System for Mobile communication
EDGE Enhanced Data for GSM Evolution
GERAN GSM EDGE Radio Access Network
E-UTRAN Evolved UTRAN
UE User Equipment
PLMN Public Land Mobile Network
IE Information Element
MCC Mobile Country Code
MNC Mobile Network Code
EAP Extensible Authentication Protocol
EAP-AKA Extensible Authentication Protocol Method for 3rd Generation Authentication and Key Agreement (RFC 4187)
EAP-AKA' Improved Extensible Authentication Protocol Method for 3rd Generation Authentication and Key Agreement (RFC 5448)
  EPC Evolved Packet Core
  AAA Authentication, Authorisation and Accounting
  REQ REQuest
  RSP ReSPonse
  AKA Authentication and Key Agreement
  AK Authentication Key
  RAND RANDom number
  XRES eXpected RESponse
  AUTN Authentication TokeN
  ePDG evolved Packet Data Gateway
  IKE Internet Key Exchange
  AUTH AUTHentication
  NAI Network Access Identifier
  ID Identity
  GW Gateway
  HA Home Agent
  LTE 3GPP Long Term Evolution
  HSPA High-Speed Packet Access
In 3GPP accesses (i.e. UTRAN, GERAN, E-UTRAN), the UE can be informed about the network name of the registered PLMN. This is particularly useful when the registered PLMN is other than home PLMN of the UE (i.e. UE roams). The network name is then often presented to the user of the UE, e.g. on a display. The user can then find out whether being at home network or a network accessible by roaming depending of the network name of the registered PLMN on the display.

3GPP specification 24.008 defines the following information elements:

9.4.19.1 Full name for network

This IE may be sent by the network. If this IE is sent, the contents of this IE indicate the "full length name of the network" that the network wishes the mobile station to associate with the MCC and MNC contained in the routing area identification of the current cell.

9.4.19.2 Short name for network

This IE may be sent by the network. If this IE is sent, the contents of this IE indicate the "abbreviated name of the network" that the network wishes the mobile station to associate with the MCC and MNC contained in the routing area identification of the cell the MS is currently in.

Equivalent IEs are defined for the circuit switched domain in sections 9.2.15a.1 and 9.2.15a.2. The encoding/structure of the network name is defined in section 10.5.3.5a.

US 2003/0119481 A1 discloses a method of arranging roaming in a telecommunication system comprising a terminal equipment, a public land mobile network (PLMN) and a local area network (LAN). The terminal equipment selects a PLMN by comparison of PLMN identifiers received from PLMNs and PLMN identifiers stored in the terminal equipment. Access can be arranged via the LAN to a network element determined by a network identifier linked with the selected PLMN. A network element identifier linked with a PLMN identifier is a realm identifier which is a part of a network access identifier. A realm identifier is preferably a domain name such as "server_finland.com" which can be used to determine internet protocol address of the server.

Similarly as in 3GPP access, the UE can select and authenticate via a PLMN other than its home PLMN in non-3GPP accesses. The UE uses EAP as authentication protocol and indicates its identity using Decorated NAI (see 3GPP specification 23.003, section 19.3.3) where the realm is the realm of the PLMN selected in the non-3GPP access.

Similarly as in 3GPP access, the PLMN selected in non-3GPP access can be interested to provide its network name to the UE so that the UE could display it. However, there is not so far a defined method how the PLMN selected in non-3GPP access could indicate its network name to the UE.

HotSpot2.0 is a standard with a specification created by the Wi-Fi Alliance to enable mobile users to join and roam among public Wi-Fi networks. The HotSpot2.0 specification defines a method, popularly called "Operator Friendly Name", how the HotSpot2.0 service provider operating HotSpot2.0 network node can indicate its network name to the UE. HotSpot2.0 network node can be connected to EPC as non-3GPP access. However, when HotSpot2.0 network node is connected to EPC, then PLMN selected in the HotSpot2.0 access network is not necessarily the HotSpot2.0 service provider operating HotSpot2.0 network node.

E.g. in the following use case, the information provided using HotSpot2.0 signalling does NOT match the PLMN selected in the non-3GPP access:

HotSpot2.0 network node is operated by a coffeehouse chain. Thus, the network name provided by the HotSpot2.0 network node relates to the name of the coffeehouse chain.

The coffeehouse chain has contract with a first and a second PLMN operator (which are both 3GPP operators) to provide HotSpot2.0 coverage for them but does not have such a contract with a third PLMN operator (which is also a 3GPP operator)

The third PLMN operator has 3GPP roaming agreement with the first PLMN operator

At this coffeehouse chain operated HotSpot2.0 network node, a UE with USIM from the third PLMN operator can select the first PLMN operator and authenticate via the first PLMN operator to a 3GPP AAA server of the third PLMN operator. If so, the first PLMN operator will wish to provide its network name to the UE but cannot due to no defined method.

It is therefore a desire to provide an approach for alleviating this problem.

SUMMARY

An object of the invention is to at least alleviate the above stated problem. The present invention is based on the understanding that adapting the approach for UE connection can enable the provision of the network name to the UE.

According to a first aspect, there is provided a method of operating a network node in a wireless local area network comprising establishing connection with a mobile terminal; requesting and receiving identity information from the mobile terminal; determining Authentication, Authorisation and Accounting, AAA, information for the mobile terminal; and sending at least one network name to the mobile terminal, wherein the at least one network names correspond to possible public land mobile networks, PLMNs, based on the determined AAA information.

The network name may comprise at least one of a full name for the PLMN and a short name for the PLMN.

The method may further comprise performing authentication of the mobile terminal with aid of one of said PLMNs. The authentication may include sending a message, including the identity information of the mobile terminal, to a server associated to a PLMN, wherein the PLMN is determined based on the determined AAA information; receiving an authentication check message from the server; sending a message based on the authentication check message to the mobile terminal; receiving a response to the message based on the authentication check message from the mobile terminal; sending a message based on the response to the server; and receiving an authentication success message from the server if the authentication succeeded.

According to an embodiment, the authentication may further include receiving an Internet Key Exchange AUTHorization, IKE_AUTH, message from the mobile terminal, the sent message, including the identity information of the mobile terminal, to the server is an Authenication and Authorization, A&A, Request, the received authentication check message is an A&A Answer, the sent message based on the authentication check message is an IKE_AUTH Response, the received response is an IKE_AUTH Request, the sent message based on the response is an A&A Request, and the authentication success message is an A&A Answer, and the sending of the network name is appended to an IKE_AUTH Response sent to the mobile terminal.

According to an embodiment, the authentication may further include sending an Extensible Authentication Protocol, EAP, Request for identity and receiving an EAP Response with the identity, and the sent message, including the identity information of the mobile terminal, to the server is an Authenication, Authorization and Accounting, AAA, message including the EAP Response with the identity and appended name of the PLMN, the received authentication check message is an AAA message including EAP Request Authentication and Key Agreement, AKA, Challenge, the sent message based on the authentication check message is an EAP Request and AKA Challenge, the received response is an EAP Response and AKA Challenge, the sent message based on the response is an AAA message including an EAP Response and AKA Challenge Request, and the authentication success message is an AAA message including EAP Success. The sending of the network name may be appended to any of the sent EAP Request and AKA Challenge, a sent EAP Request and AKA Notification, and an EAP Success message sent to the mobile terminal.

Here, it should be noted that EAP-AKA and EAP-AKA' are two very similar protocols, where the latter is a newer version of the former. Throughout this disclosure, what applies for EAP-AKA messages applies also for EAP-AKA' and vice verse, unless explicitly stated otherwise.

The method may include sending a name of a PLMN available at the network node and for the mobile terminal based on the determined AAA information to the mobile terminal.

According to a second aspect, there is provided a method of operating a network node in a wire less local area network comprising establishing connection with a mobile terminal; receiving a request from the mobile terminal for available PLMNs; sending names of all available PLMNs at the network node to the mobile terminal; receiving a message from the mobile terminal indicating one of the available PLMNs as selected PLMN; and assigning the selected PLMN for further processing.

According to one embodiment, the method further comprises requesting and receiving identity information from the mobile terminal According to a third aspect, there is provided a method of operating a mobile terminal for connecting to a network node of a wireless local area network comprising establishing connection with the network node; receiving a request for identity information from the network node; sending identity information to the network node; receiving at least one network name from the network node, wherein the at least one network names correspond to possible public land mobile networks based on Authentication, Authorisation and Accounting, AAA, information associated with the mobile terminal.

The network name may comprise at least one of a full name for the PLMN and a short name for the PLMN.

The method may further comprise authenticating the mobile terminal to one of the PLMNs. The authenticating may include receiving an authentication check message from the network node; digesting the authentication check message and generating a response; sending the response to the authentication check message to the network node; and receiving an authentication success message from the network node if the authentication succeeded.

According to an embodiment, the authenticating may further include sending an Internet Key Exchange AUTHorization, IKE_AUTH, message to the network node, the received authentication check message is an IKE_AUTH Response, the sent response is an IKE_AUTH Request, and the authentication success message is an IKE_AUTH Response sent to the mobile terminal to which the network name is appended.

According to an embodiment, the authentication may further include receiving an Extensible Authentication Protocol, EAP, Request for identity and sending an EAP Response with the identity, the received authentication check message is an EAP Request and AKA Challenge, the sent response is an EAP Response and AKA Challenge, and the authentication success message is an EAP Success message. The received network name may be appended to any of the received EAP Request and AKA Challenge, a received EAP Request and AKA Notification, and the EAP Success message.

The received name of a PLMN may be of a PLMN available at the network node and for the mobile terminal based on the AAA information of the mobile terminal.

According to a fourth aspect, there is provided a method of operating a mobile terminal for connecting to a network node of a wireless local area network comprising establishing connection with the network node; receiving names of all available PLMNs at the network node; selecting one PLMN among the PLMN names; and sending a message to the network node indicating the selected PLMN, wherein the selected PLMN is assigned for further processing.

According to an embodiment, the method may further comprise receiving a request for identity information from the network node; and sending identity information to the network node.

According to a fifth aspect, there is provided a method of operating a server in a public land mobile network comprising receiving a network name and an inbound extensible authentication protocol, EAP, message emanating from a mobile terminal established in connection with a network node of a wireless local access area network from the network node of the wireless local area network; generating an outbound EAP message for the mobile terminal including the network name; and transmitting the outbound EAP message to the network node of the wireless local area network.

The outbound EAP message may be an EAP Request and authentication and key agreement challenge message.

The outbound EAP message may be an EAP Request and authentication and key agreement notification message.

The outbound EAP message may be an EAP success message.

According to a sixth aspect, there is provided a network node in a wireless local area network arranged to establish connection with a mobile terminal; request and receive identity information from the mobile terminal; determine Authentication, Authorisation and Accounting, AAA, information for the mobile terminal; and send at least one network name to the mobile terminal, wherein the at least one network names correspond to possible public land mobile networks, PLMNs, based on the determined AAA information.

According to a seventh aspect, there is provided a network node in a wireless local area network arranged to establish connection with a mobile terminal; receive a request from the mobile terminal for available public land mobile networks, PLMNs; send names of all available PLMNs at the network node to the mobile terminal; receive a message from the mobile terminal indicating one of the available PLMNs as selected PLMN; and assign the selected PLMN for further processing.

According to an eighth aspect, there is provided a mobile terminal enabled for connecting to a network node of a wireless local area network, wherein the mobile terminal is arranged to establish connection with the network node; receive a request for identity information from the network node; send identity information to the network node; receive at least one network name from the network node, wherein the at least one network names correspond to possible public land mobile networks based on Authentication, Authorisation and Accounting, AAA, information associated with the mobile terminal.

According to a ninth aspect, there is provided a mobile terminal enabled for connecting to a network node of a wireless local area network, wherein the mobile terminal is arranged to establish connection with the network node; receive names of all available PLMNs at the network node; select one PLMN among the PLMN names; and send a message to the network node indicating the selected PLMN, wherein the selected PLMN is assigned for further processing.

According to a tenth aspect, there is provided a server in a public land mobile network arranged to receive a network name and an inbound extensible authentication protocol, EAP, message emanating from a mobile terminal established in connection with a network node of a wireless local access area network from the network node of the wireless local area network; generate an outbound EAP message for the mobile terminal including the network name; and transmit the outbound EAP message to the network node of the wireless local area network.

According to an eleventh aspect, there is provided a computer program comprising computer code with computer executable instructions which when executed by a processor causes the processor to control an electronic device as of the fourth to sixth aspects to perform the method according to any of the first to third aspects, respectively.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, eta]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

A network node, i.e. an entity in non-3GPP wireless access, which the UE authenticates via, is arranged to indicate the Full name for network according to same structure as in 3GPP specification 24.008 or similar and/or the Short name for network according to same structure as in 3GPP specification 24.008 or similar to the UE. This is demonstrated in detail below with reference to a few embodiments wherein the demonstrated details are made with strong reference to corresponding context as specified in the 3GPP specification, whereby a person skilled in the art readily will understand how to apply the inventive contribution.

As the network node can be connected with 3GPP network using different methods, as defined in the 3GPP specification, different entities provide the Full name for network and/or the Short name for network to the UE in each method.

Figure 1A:
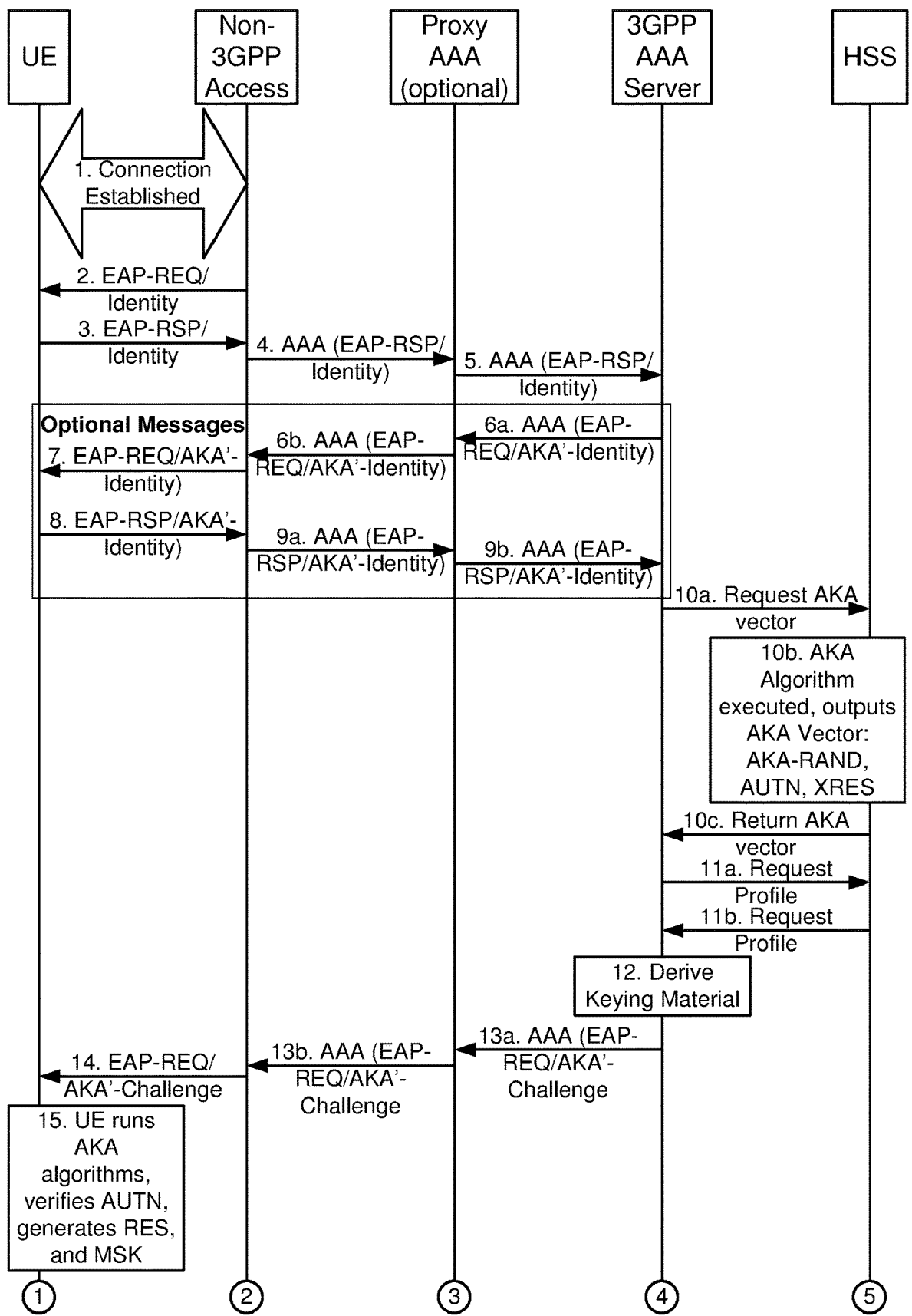
FIGS. 1A, 1B, 2, 3, 4, 5A, 5B, and 6 are signalling schemes illustrating communications between mobile terminal, network node and entities associated with PLMN according to respective embodiments.
Figure 1B:
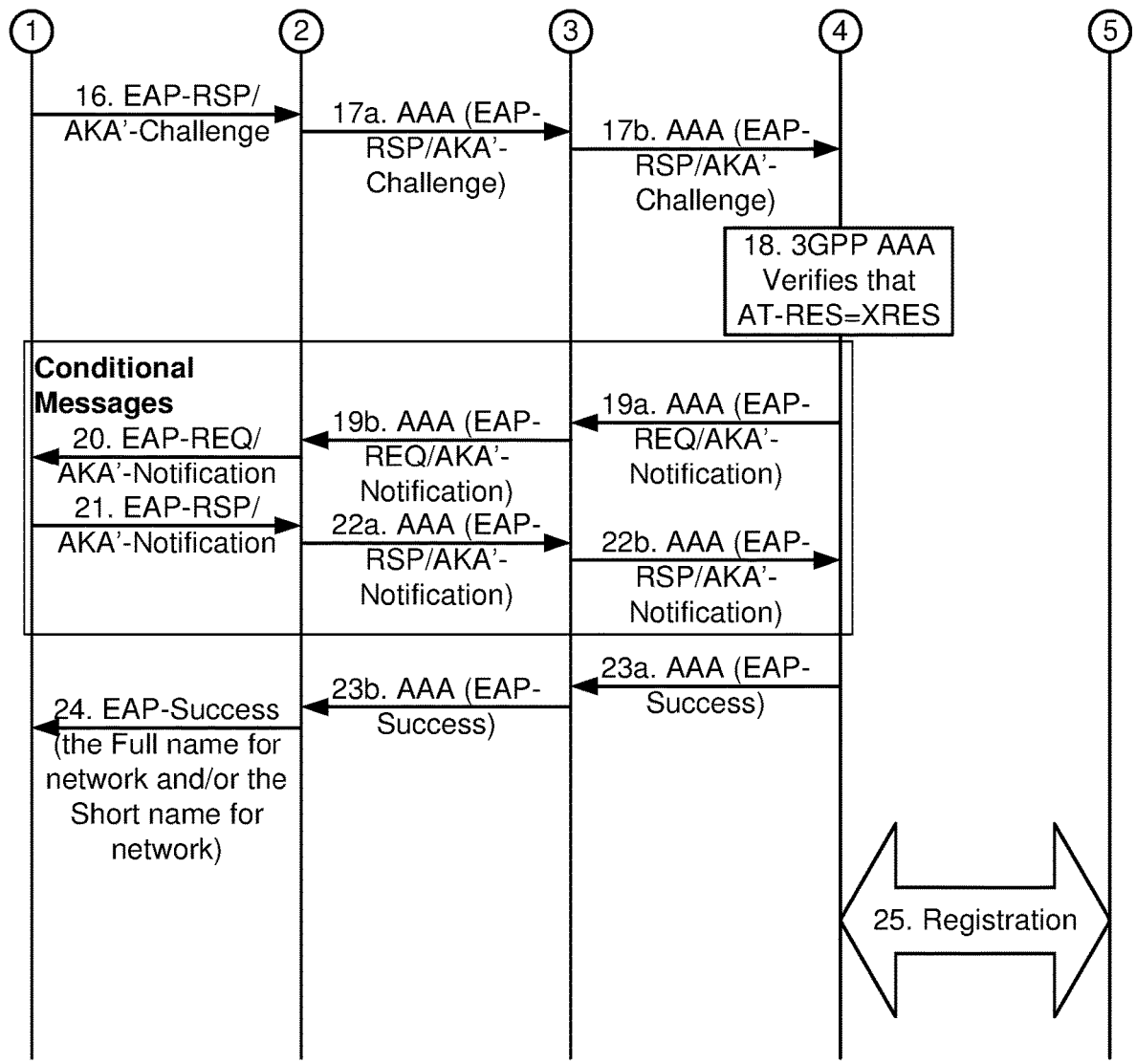

FIGS. 1A and 1B together are a signalling scheme illustrating communications between mobile terminal (UE), network node (Non-3GPP Access) and entities associated with PLMN (Proxy AAA, 3GPP AAA Server, HSS) according to an embodiment. It should be noted that FIGS. 1A and 1B are based on FIG. 6.2-1 of 3GPP specification 33.402 for the person skilled in the art readily should understand the context of the solution and the contribution, where the transmission of the network name is emphasized by bold text in FIGS. 1A and 1B.

When the 3GPP based access authentication, as specified in 3GPP specifications 23.402, section 4.9.1, and 33.402 section 6.2, is used in the network node connected to EPC, the authenticator in the network node inserts the Full name for network according to same structure as in 3GPP specification 24.008 or similar, and/or the Short name for network according to same structure as in 3GPP specification 24.008 or similar in an EAP Success message sent to the UE. In this method, the Fullname for network and/or the Short name for network are provided without integrity protection.

Figure 2:
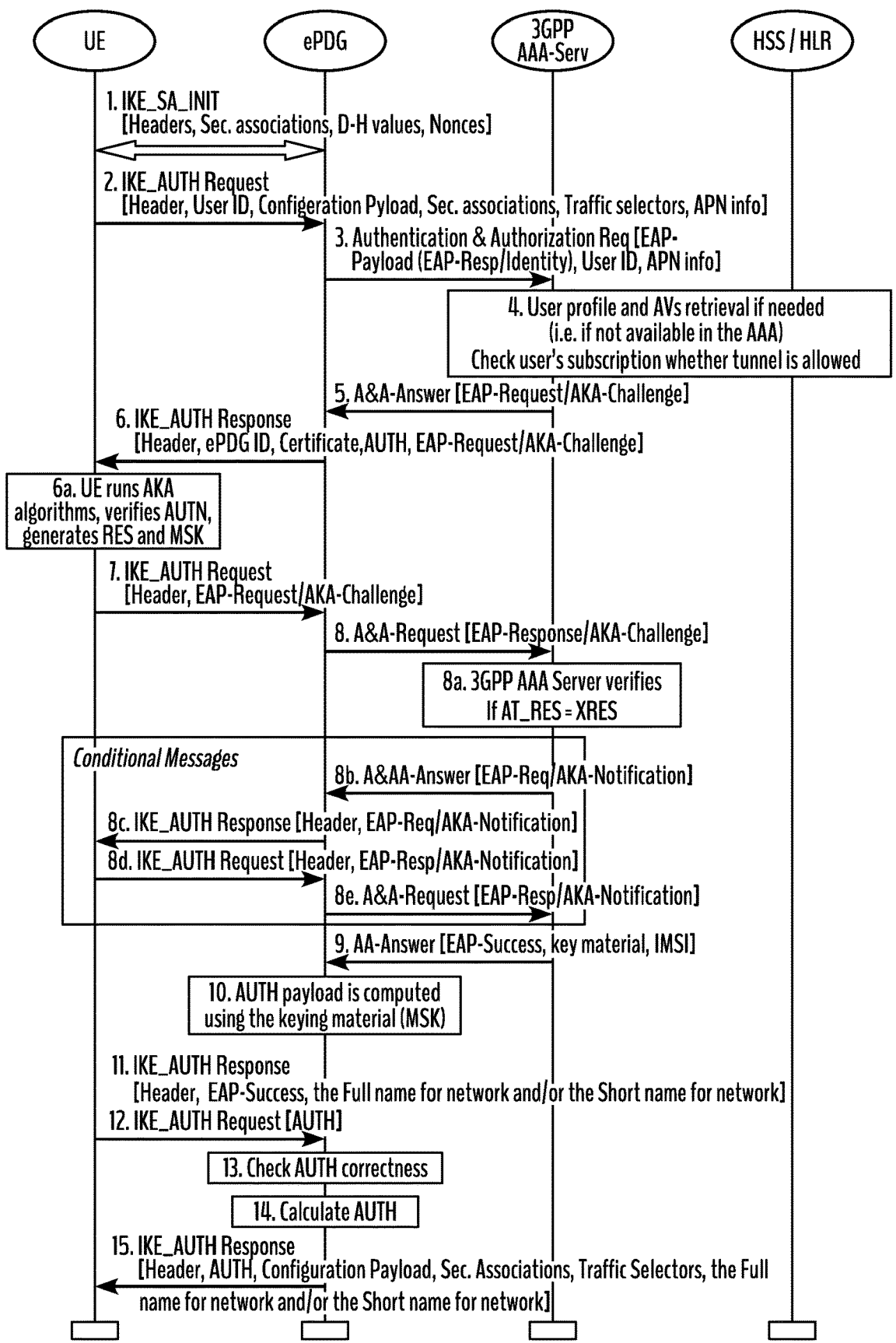

FIG. 2 is a signalling scheme illustrating communications between mobile terminal (UE), network node (ePDG) and entities associated with PLMN (3GPP AAA Server, HSS/HLR) according to an embodiment. It should be noted that FIG. 2 is based on FIG. 8.2.2-1 of 3GPP specification 33.402 for the person skilled in the art readily should understand the context of the solution and the contribution, where the transmission of the network name is emphasized by bold text in FIG. 2, i.e. the Full name for network and/or Short name for network can be provided in transmissions 11 or 15, or both.

For a network node connected with 3GPP network using a tunnel authentication as specified in 3GPP specifications 23.402, section 4.9.2, and 33.402, section 8.2.2, is used in a network node connected to EPC, the ePDG inserts the Full name for network according to same structure as in 3GPP specification 24.008 or similar and/or the Short name for network according to same structure as in 3GPP specification 24.008 or similar into an IKE_AUTH response message sent to the UE.

Figure 3:
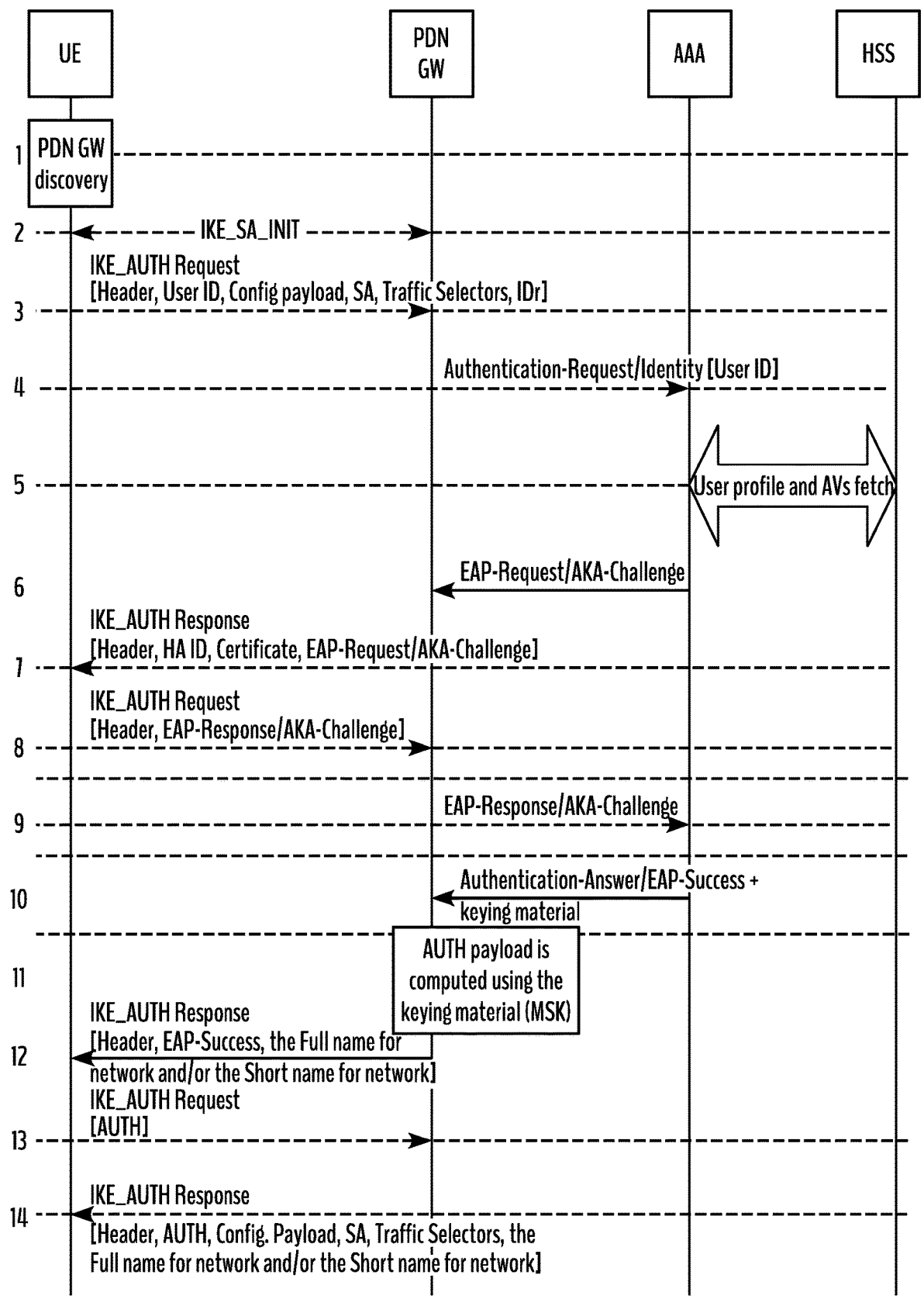

FIG. 3 is a signalling scheme illustrating communications between mobile terminal (UE), network node (PDN GW) and entities associated with PLMN (AAA, HSS) according to an embodiment. For a network node connected with 3GPP network using a tunnel authentication as specified in 3GPP specifications 23.402, section 4.9.2, and 33.402, section 8.2.2, is used in the network node connected to EPC, the P-GW/HA inserts the Full name for network according to same structure as in 3GPP specification 24.008 or similar and/or the Short name for network according to same structure as in 3GPP specification 24.008 or similar into an IKE_AUTH response message sent to the mobile terminal, as indicated in steps 12 or 14 of FIG. 3.

Figure 4:
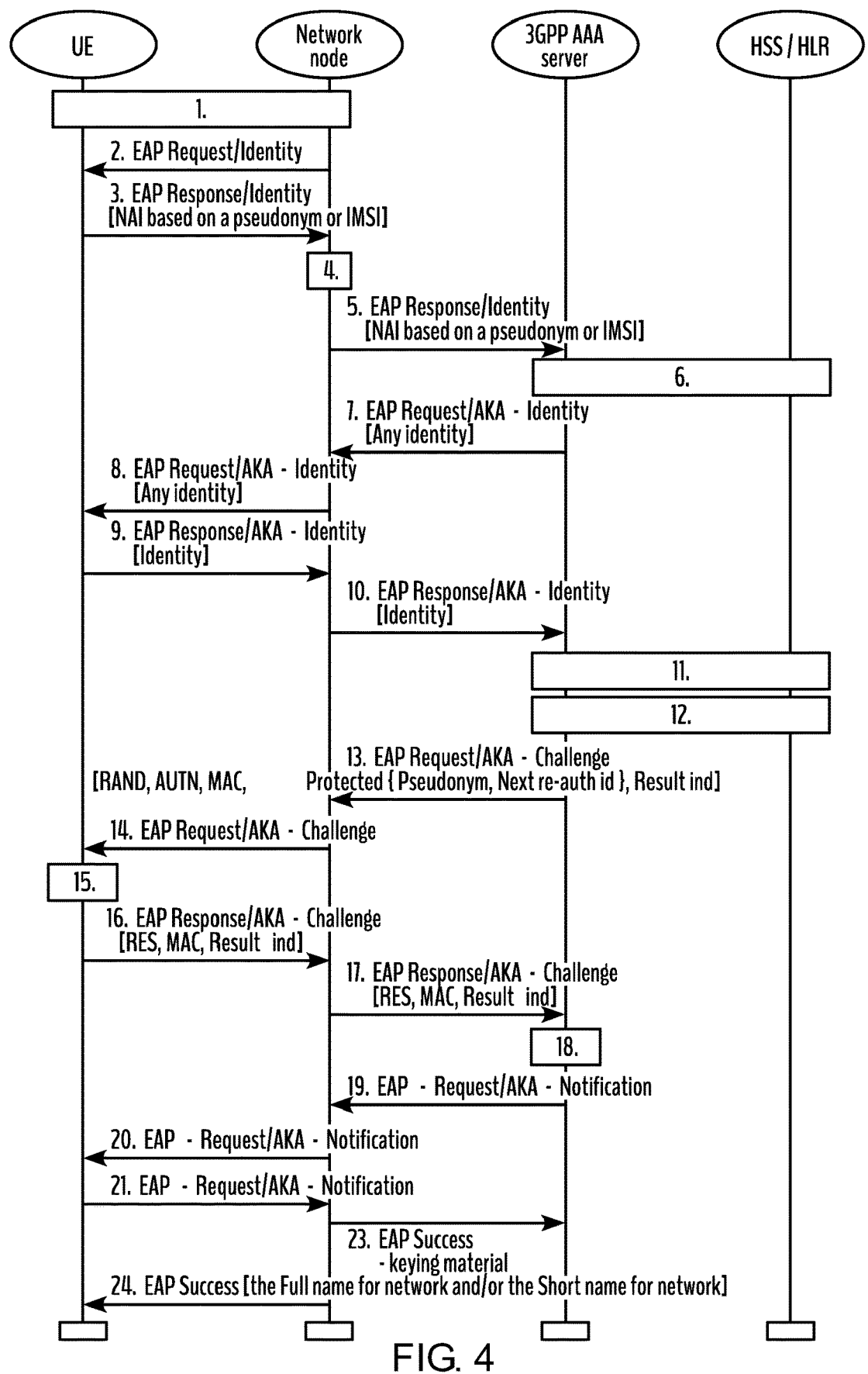

FIG. 4 is a signalling scheme illustrating communications between mobile terminal (UE), network node and entities associated with PLMN (3GPP AAA Server, HSS/HLR) according to an embodiment. It should be noted that FIG. 4 is based on FIG. 4 of 3GPP specification 33.234 for the person skilled in the art readily should understand the context of the solution and the contribution.

When I-WLAN is used as specified in 3GPP specifications 23.234, section 7.2, and 33.234, section 6.1.1.1, the WLAN access network inserts the Full name for network according to same structure as in 3GPP specification 24.008 or similar and/or the Short name for network according to same structure as in 3GPP specification 24.008 or similar in an EAP Success message sent to the UE. In this method, the Full name for network and/or the Short name for network are provided without integrity protection.

In the embodiments demonstrated above, the network name emanates from the network node and is sent to the mobile terminal. The network name can also be provided from the network node to a 3GPP AAA server for being arranged in a message provided from the PLMN to the mobile terminal via the network node. Thus, the network node, i.e. entity in non-3GPP wireless access, which the mobile terminal authenticates via, indicates the Full name for network according to same structure as in 3GPP specification 24.008 or similar and/or the Short name for network according to same structure as in 24.008 or similar to the 3GPP AAA Server. The 3GPP AAA Server copies the received Full name for network and/or the received Short name for network to EAP message(s) sent to the mobile terminal via the network node.

Figure 5A:
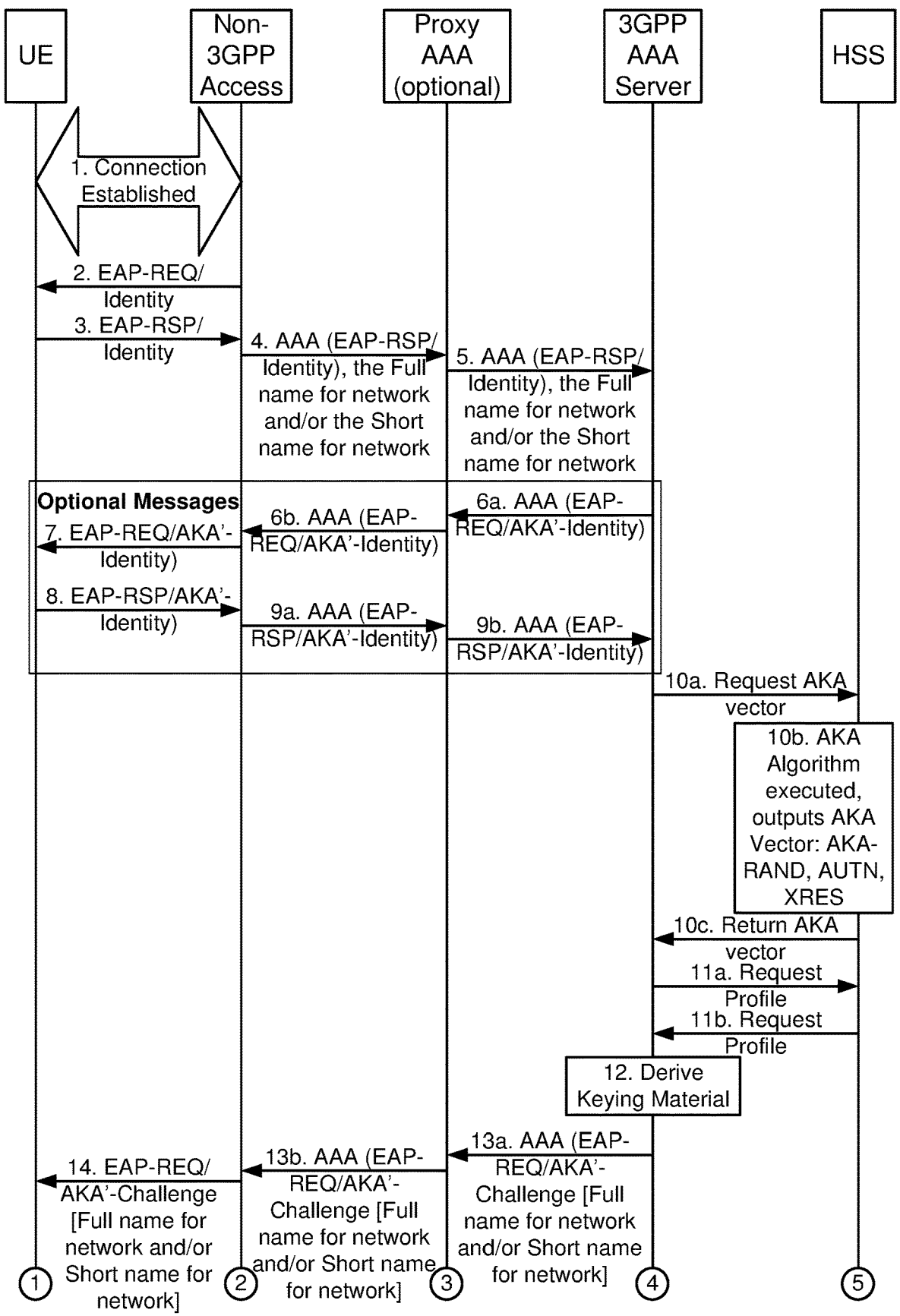
Figure 5B:
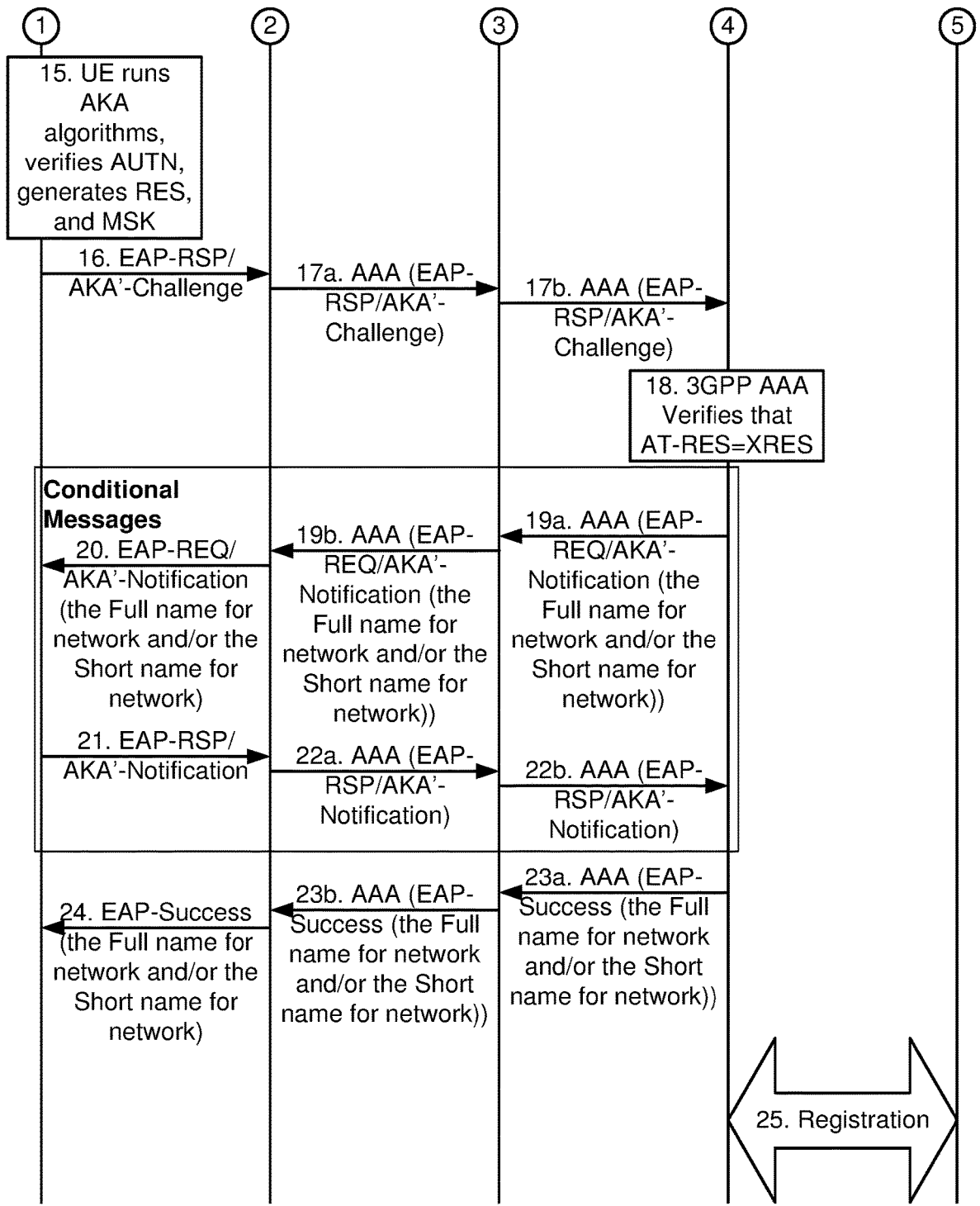

FIGS. 5A and 5B together are a signalling scheme illustrating communications between mobile terminal (UE), network node (Non-3GPP Access) and entities associated with PLMN (Proxy AAA, 3GPP AAA Server, HSS) according to an embodiment. It should be noted that FIGS. 5A and 5B are based on FIG. 6.2-1 of 3GPP specification 33.402 for the person skilled in the art readily should understand the context of the solution and the contribution, where the transmission of the network name is emphasized by bold text in FIGS. 5A and 5B.

When the 3GPP based access authentication as specified in 3GPP specifications 23.402, section 4.9.1, and 33.402, section 6.2, is used in the network node connected to EPC, the authenticator in the network node inserts the Full name for network according to same structure as in 24.008 or similar and/or the Short name for network according to same structure as in 24.008 or similar in an AAA message, e.g. along with EAP response and Identity, sent towards the 3GPP AAA server. The 3GPP AAA server copies the received Full name for network and/or the received Short name for network in an EAP message, e.g. EAP Success, EAP Request and AKA Challenge or EAP Request and AKA Notification, sent to the mobile terminal via the network node. In this method, the Full name for network and/or Short name for network can be provided with integrity protection.

Figure 6:
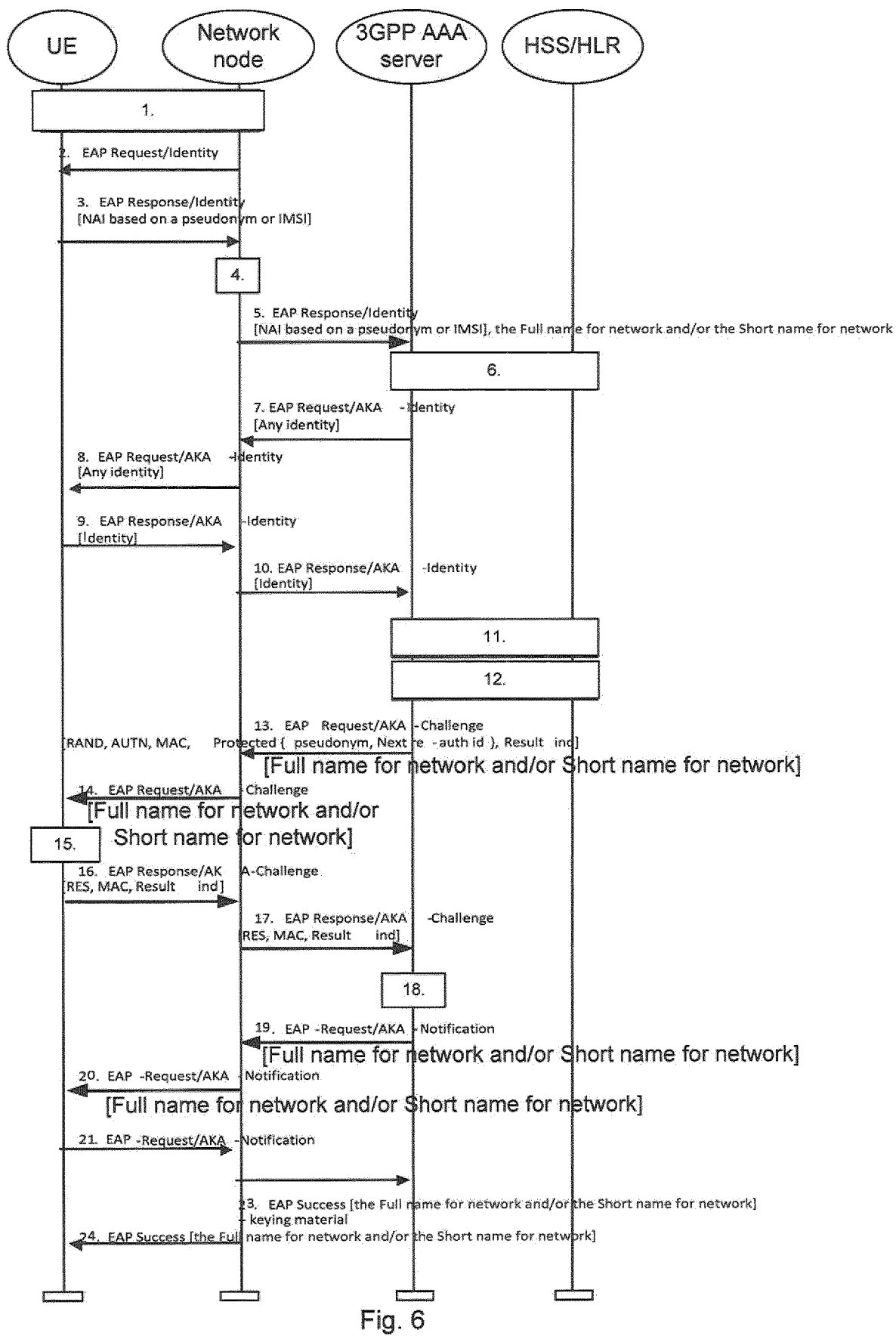

FIG. 6 is a signalling scheme illustrating communications between mobile terminal (UE), network node and entities associated with PLMN (3GPP AAA Server, HSS/HLR) according to an embodiment. It should be noted that FIG. 6 is based on FIG. 4 of 3GPP specification 33.234 for the person skilled in the art readily should understand the context of the solution and the contribution.

When I-WLAN is used as specified in 3GPP specifications 23.234, section 7.2, and 33.234, section 6.1.1.1, the WLAN access network inserts the Full name for network according to same structure as in 3GPP specification 24.008 or similar and/or the Short name for network according to same structure as in 3GPP specification 24.008 or similar in an AAA message, e.g. along with EAP Response and Identity, sent towards the 3GPP AAA server. The 3GPP AAA server copies the received Full name for network and/or the received Short name for network in an EAP message, e.g. EAP Success, EAP Request and AKA Challenge, or EAP Request and AKA Notification, which is sent to the mobile terminal via the network node. In this method, the Full name for network and/or the Short name for network can be provided with integrity protection.

Upon using e.g. a 802.1x wireless access, and when the mobile terminal performs network discovery by authenticating using NAI with unknown realm, e.g. alternative NAI as in 3GPP specification 24.234, section 4.4.1, a local AAA server sends Full name for network according to same structure as in 3GPP specification 24.008 or similar and/or Short name for network according to same structure as in 3GPP specification 24.008 or similar associated with the realm of PLMNs available at the network node. Each realm of an available PLMN can thus be associated with a different Full name for network and/or Short name for network.

When the mobile terminal performs network discovery by querying network node using 802.11u, the network node sends Full name for network according to same structure as in 3GPP specification 24.008 or similar and/or Short name for network according to same structure as in 3GPP specification 24.008 or similar associated with the realm (or MCC/MNC) of PLMNs available at the network node. Each realm (or MCC/MNC) of an available PLMN can be associated with a different Full name for network and/or Short name for network.

In contrast to 'Operator Friendly Name' defined in the HotSpot2.0 specification, the Full name for network and/or Short name for network is provided for any service provider or for any 3GPP PLMN available at the network node, i.e. not just the service provider operating the network node.

Below, methods for the respective mobile terminal, network node and PLMN associated server are demonstrated. The methods are demonstrated on a general level for easy understanding of the principles and should be construed together with the signalling embodiments demonstrated above for understanding details of implementation. It should also be understood that the steps are not necessary performed in the order as depicted. The constraint on the order of the steps is only limited by availability to required information, and, optionally, on success in authentication.

Figure 7:
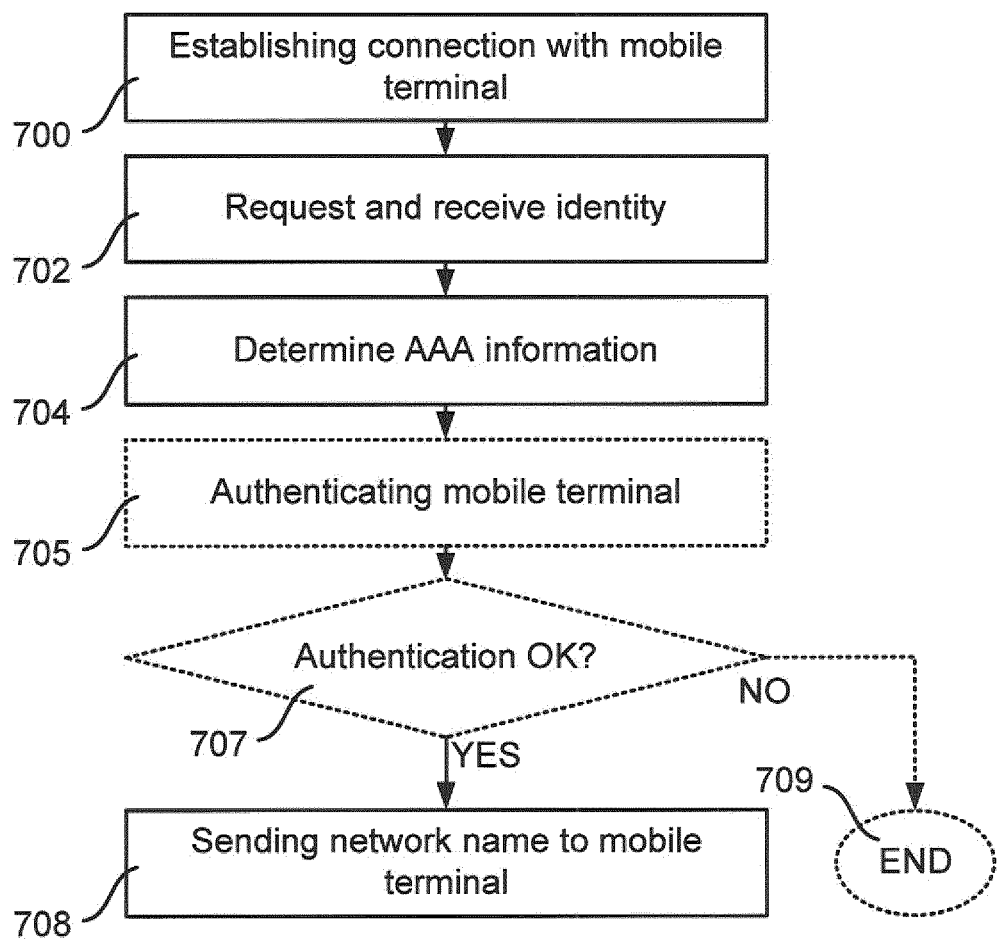
FIG. 7 is a flow chart illustrating a method for a network node according to an embodiment.

FIG. 7 is a flow chart illustrating a method for a network node according to an embodiment. Connection with a mobile terminal is established 700. The network node performs 702 requesting of identity of the mobile terminal and receives its identity. This step 702 can be inherent in the connection establishment 700, or be a separate issue, as can be seen for the different signalling scenarios demonstrated with reference to FIGS. 1A, 1B, 2, 3, 4, 5A, 5B, and 6. From the received information, the network node determines 704 AAA information for the mobile terminal. Based on this AAA information, the network node sends 708 the network name to the mobile terminal. Optionally, the network node performs authentication 705 on the mobile terminal, and if the authentication succeeds 707, the processing can continue, or if the authentication fails, the processing can end.

Figure 8:
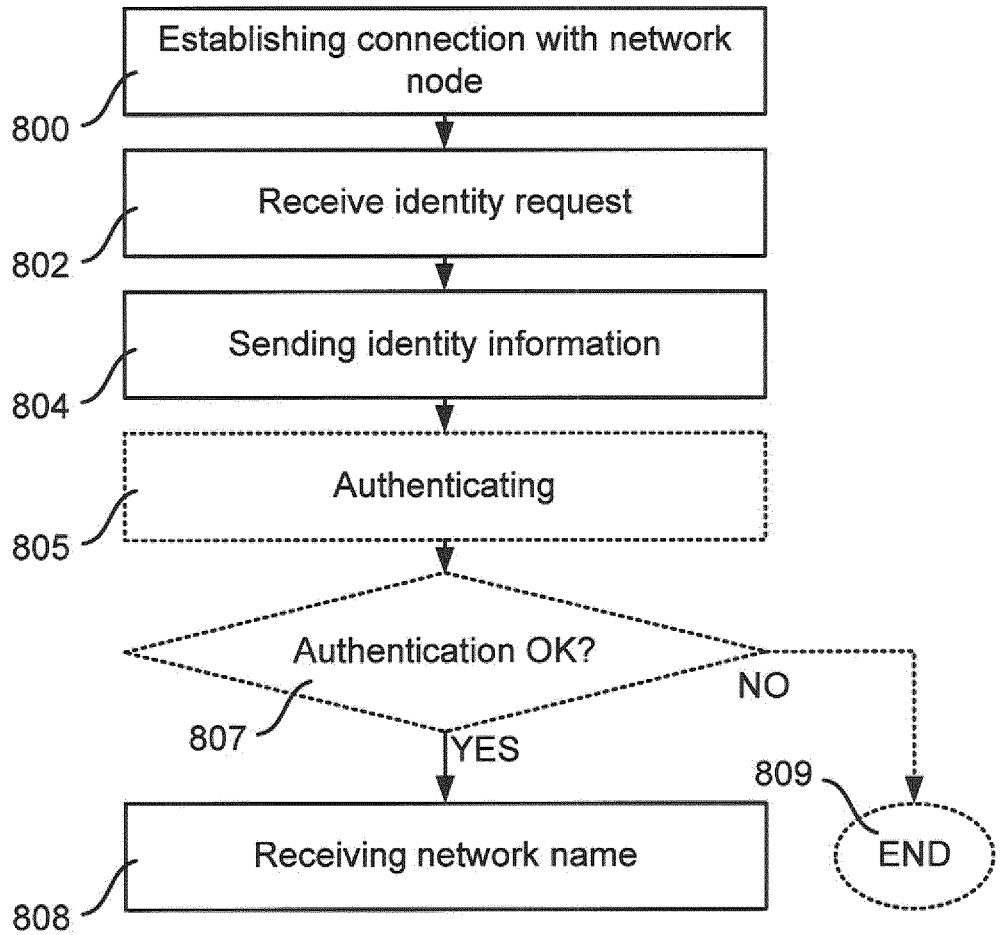
FIG. 8 is a flow chart illustrating a method for a mobile terminal according to an embodiment.

FIG. 8 is a flow chart illustrating a method for a mobile terminal according to an embodiment. Connection is established 800 with a network node of a wireless local area network. An identity request is received 802, to which a response is sent 804 with the requested identity. These steps 802, 804 can be inherent in the connection establishment 800, or be a separate issue, as can be seen for the different signalling scenarios demonstrated with reference to FIGS. 1A, 1B, 2, 3, 4, 5A, 5B, and 6. The network name is received 808 from the network node. Optionally, the mobile terminal can authenticate 805 itself to the network node, which is the physical connecting partner but the authentication is normally just communicating via the network node as indicated in FIGS. 1A, 1B, 2, 3, 4, 5A, 5B, and 6. If authentication succeeds 807, a corresponding message is normally received, and if the authentication fails, the procedure normally ends. The network name can be appended to any of the received messages included in the authentication.

Figure 9:
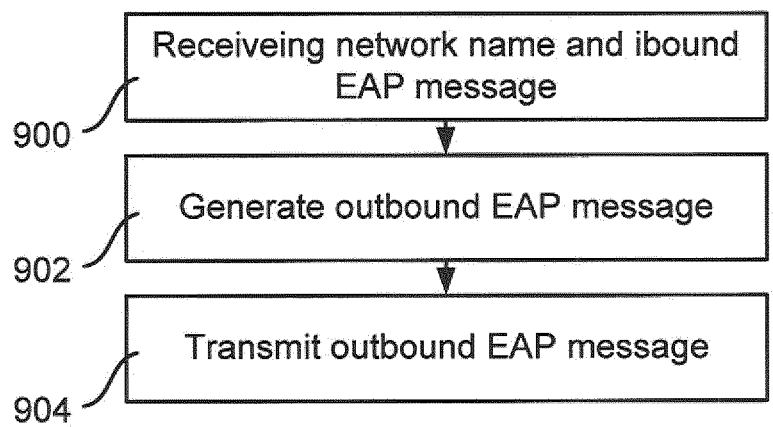
FIG. 9 is a flow chart illustrating a method for a server according to an embodiment.

FIG. 9 is a flow chart illustrating a method for a server according to an embodiment. As described with reference to any of FIGS. 5A and 5B or FIG. 6, the network name is provided from the network node to the PLMN associated server for being embedded into an EAP message, which then is provided to the mobile terminal via the network node. Thus, the server receives 900 the network name along with inbound EAP message, both included in AAA message, generates 902 an AAA message containing outbound EAP message including the network name and transmits 904 the outbound EAP message to the network node.

Figure 10:
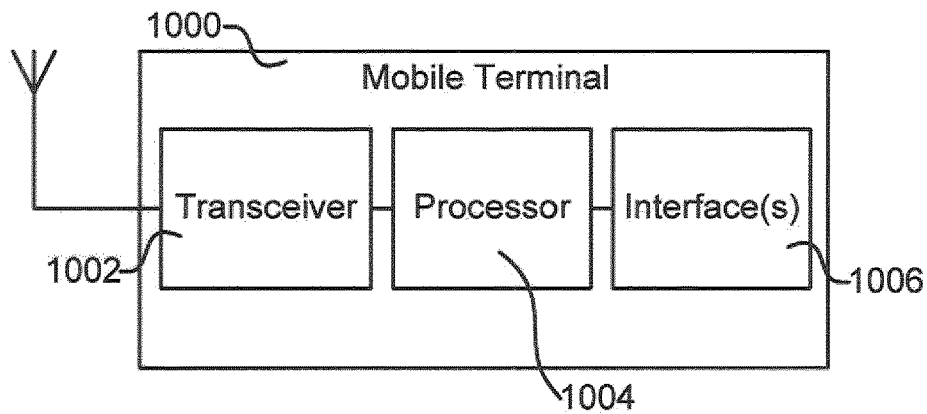
FIG. 10 is a block diagram which schematically illustrates a mobile terminal according to an embodiment.

FIG. 10 is a block diagram which schematically illustrates a mobile terminal 1000 according to an embodiment. The mobile terminal 1000 comprises a transceiver 1002 arranged for wireless communication in both WLAN technology and cellular technology, i.e. as specified in the 3GPP specification. The mobile terminal 1000 comprises a processor 1004 arranged to control operation of the mobile terminal 1000, and particularly arranged to control operation as demonstrated above with reference to FIGS. 1A, 1B, 2, 3, 4, 5A, 5B, 6, and 7. The mobile terminal 1000 also comprises one or more interfaces 1006, which can be electrical or optical interfaces for communicating with other circuitry or electronic entities, or a user interface, as known in the art and therefore not further elucidated here.

Figure 11:
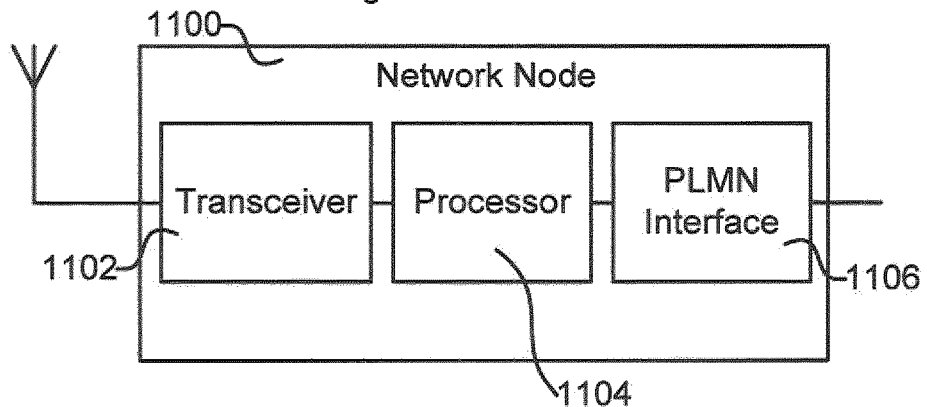
FIG. 11 is a block diagram which schematically illustrates a network node according to an embodiment.

FIG. 11 is a block diagram which schematically illustrates a network node 1100 according to an embodiment. The network node 1100 comprises a transceiver 1102 arranged for wireless communication in both WLAN technology. The network node 1100 comprises a processor 1104 arranged to control operation of the network node 1100, and particularly arranged to control operation as demonstrated above with reference to FIGS. 1A, 1B, 2, 3, 4, 5A, 5B, 6, and 8. The network node 1100 also comprises an interface 1106, which can be electrical or optical interface for communicating with entities of one or more PLMNs, and can use data communication technology as known in the art and therefore not further elucidated here.

Figure 12:
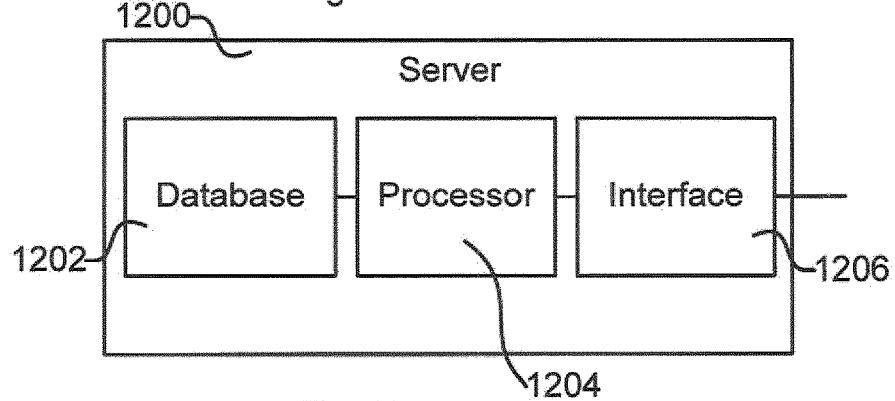
FIG. 12 is a block diagram which schematically illustrates a server according to an embodiment.

FIG. 12 is a block diagram which schematically illustrates a server 1200, associated with a PLMN, according to an embodiment. The server 1200 normally comprises a database 1202 for subscriber information to handle security and administration, such as AAA issues. The server 1200 also comprises a processor 1204 arranged to control operation of the server 1200, and particularly arranged to control operation as demonstrated above with reference to FIGS. 1A, 1B, 2, 3, 4, 5A, 5B, 6 and 9. The server 1200 also comprises an interface 1206, which can be electrical or optical interface for communicating with entities of one or more network nodes or any control and interface circuitry associated with one or more network nodes, and can use data communication technology as known in the art and therefore not further elucidated here.

Figure 13:
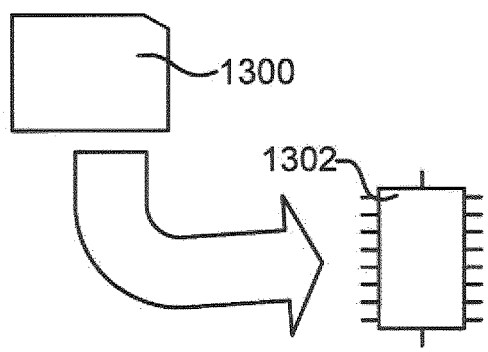
FIG. 13 schematically illustrates a computer-readable medium and a processor arranged to execute instructions of a computer program stored on the computer-readable medium.

FIG. 13 schematically illustrates a computer-readable medium 1300 and a processor 1302 arranged to execute instructions of a computer program stored on the computer-readable medium. The processor 1300 can be any of the processors 1004, 1104, 1204 demonstrated with reference to FIGS. 10 to 12, respectively, above. The instructions of the computer program are thus preferably adapted to the respective utility in the mobile terminal, network node or server.

The methods according to the present invention is suitable for implementation with aid of processing means, such as computers and/or processors, especially for the cases demonstrated above. Therefore, there is provided computer programs, comprising instructions arranged to cause the processing means, processor, or computer to perform the steps of any of the methods according to any of the embodiments described with reference to FIGS. 1A, 1B, 2, 3, 4, 5A, 5B, 6, 7, 8, and 9. The computer programs preferably comprises program code which is stored on a computer readable medium 1300, as illustrated in FIG. 13, which can be loaded and executed by a processing means, processor, or computer 1302 to cause it to perform the methods, respectively, according to embodiments of the present invention, preferably as any of the embodiments described with reference to FIGS. 1A, 1B, 2, 3, 4, 5A, 5B, 6, 7, 8, and 9. The computer readable medium 1300 is preferably non-transitory. The computer 1302 and computer program product 1300 can be arranged to execute the program code sequentially where actions of the any of the methods are performed stepwise. The processing means, processor, or computer 1302 is preferably what normally is referred to as an embedded system. Thus, the depicted computer readable medium 1300 and computer 1302 in FIG. 13 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of operating a server in a public land mobile network (PLMN), the method comprising: receiving a network name of the PLMN and an inbound extensible authentication protocol (EAP) message emanating from a mobile terminal established in connection with a network node of a wireless local access area network from the network node of the wireless local area network; generating an outbound EAP message for the mobile terminal including the network name of the PLMN; and transmitting the outbound EAP message to the network node of the wireless local area network, the method further comprising performing authentication of the mobile terminal by: receiving a message, including identity information of the mobile terminal, from the network node: sending an authentication check message to the network node: receiving, from the network node, a message being based on a response to the network node from the mobile terminal to a message having been sent by the network node to the mobile terminal based on the authentication check message; and sending an authentication success message to the network node when the authentication succeeded, wherein the authentication farther includes receiving an Extensible Authentication Protocol (EAP) Request for identity and sending are EAP Response with the identity, and the received message which includes the identity information of the mobile terminal is an Authentication, Authorization and Accounting (AAA) message including the EAP Response with the identity and appended name of the PLMN, the sent authentication check message is an AAA message including EAP Request Authentication and Key Agreement (AKA) Challenge, the message having been sent by the network node to the mobile terminal based on the authentication check message is an EAP Request and AKA Challenge, the response to the network node from the mobile terminal is an EAP Response and AKA Challenge, the received message being based on the response to the network node from the mobile terminal is an AAA message including an EAP Response and AKA Challenge, and the authentication success message is an AAA message including EAP Success, and wherein the network name is appended to any of the sent EAP Request and AKA Challenge, a sent EAP Request and AKA Notification, and an EAP Success message sent to the mobile terminal.

2. The method according to claim 1, wherein EAP messaging works according to either EAP Authentication and Key Agreement (AKA) or to Improved Extensible Authentication Protocol Method for 3rd Generation Authentication and Key Agreement (EAP AKA').

3. A server in a public land mobile network (PLMN) comprising: a processor; a non-transitory process-readable storage medium; and an interface configured to communicate with one or more of a network node and interface circuitry associated with one or more network nodes, wherein the processor is configured to perform: receiving a network name of the PLMN and an inbound extensible authentication protocol (EAP) message emanating from a mobile terminal established in connection with a network node of a wireless local access area network from the network node of the wireless local area network; generating an outbound EAP message for the mobile terminal including the network name of the PLMN; and transmitting the outbound EAP message to the network node of the wireless local area network, wherein the server is further arranged to perform authentication of the mobile terminal by: receiving a message, including identity information of the mobile terminal, from the network node; sending an authentication check message to the network node; receiving, from the network node, a message being based on a response to the network node from the mobile terminal to a message having been sent by the network node to the mobile terminal based on the authentication check message; and sending an authentication success message to the network node when the authentication succeeded, wherein the authentication farther includes receiving an Extensible Authentication Protocol (EAP) Request for identity and sending an EAP Response with the identity, and the received message which includes the identity information of the mobile terminal is an Authentication, Authorization and Accounting (AAA) message including the EAP Response with the identity and appended name of the PLMN, the sent authentication check message is an AAA message including EAP Request Authentication and Key Agreement (AKA) Challenge, the message having been sent by the network node to the mobile terminal based on the authentication check message is an EAP Request and AKA Challenge, the response to the network node from the mobile terminal is an EAP Response and AKA Challenge; the received message being based on the response to the network node from the mobile terminal is an AAA message including an EAP Response and AKA Challenge, and the authentication success message is an AAA message including EAP Success, and wherein the network name is appended to any of the sent EAP Request and AKA Challenge, a sent EAP Request and AKA Notification, and an EAP Success message sent to the mobile terminal.

4. The server according to claim 3, wherein EAP messaging works according to either EAP Authentication and Key Agreement (AKA) or to Improved Extensible Authentication Protocol Method for 3rd Generation Authentication and Key Agreement (EAP AKA').

* * * * *